US006505824B2

(12) United States Patent
Laughlin et al.

(10) Patent No.: US 6,505,824 B2

(45) Date of Patent: Jan. 14, 2003

(54) CLAMPING FRAME FOR PLASTIC SHEET THERMOFORMING APPARATUS

(75) Inventors: Gerry Jurs Laughlin, Summerville, SC (US); Paul David Spies, Mt. Pleasant, SC (US)

(73) Assignee: Dynamic Plastic Solutions, Mt. Pleasant, SC (US)

( * ) Notice: Subject to any disclaimer, the term of this patent is extended or adjusted under 35 U.S.C. 154(b) by 0 days.

(21) Appl. No.: 09/908,351

(22) Filed: Jul. 18, 2001

(65) Prior Publication Data

US 2002/0093132 A1 Jul. 18, 2002

Related U.S. Application Data

(60) Provisional application No. 60/261,663, filed on Jan. 16, 2001.

(51) Int. Cl.[7] .................................................. B23Q 3/08

(52) U.S. Cl. .......................................................... 269/32

(58) Field of Search ............................ 269/32, 900, 25, 269/20, 21, 238, 91, 93

(56) References Cited

U.S. PATENT DOCUMENTS 3,166,790 A 1/1965 Keyes
3,599,959 A 8/1971 Asenbauer
3,659,991 A 5/1972 Diamond
3,910,747 A 10/1975 Dean et al.
4,533,555 A 8/1985 Harris
4,555,377 A 11/1985 Whiteside et al.
4,901,990 A * 2/1990 Frechette .................... 269/900
4,938,678 A 7/1990 Oulman
5,843,492 A 12/1998 McCorry
5,863,568 A 1/1999 Tomita et al.
5,975,879 A 11/1999 Dresen et al.
5,980,231 A 11/1999 Arends et al.
6,086,354 A 7/2000 Dresen et al.
6,279,887 B1 * 8/2001 Glasenapp et al. ........... 269/32

* cited by examiner

*Primary Examiner*—Robert C. Watson

(74) *Attorney, Agent, or Firm*—Alston & Bird LLP

(57) ABSTRACT

A clamping frame for a plastic sheet thermoforming apparatus and which is designed for gripping and retaining the peripheral edge of the plastic sheet. The frame includes a pair of pivotally interconnected jaws which are pivoted between open and closed positions by an air cylinder actuator. The actuator is mounted to one of the jaws, and the operative pressurized air is fed to and removed from the actuator via fluid delivery lines which are located within the interior of the jaw to which the actuator is mounted. External air hoses are thereby avoided, and the air streams which flow through the jaw have a cooling effect.

15 Claims, 3 Drawing Sheets

CLAMPING FRAME FOR PLASTIC SHEET THERMOFORMING APPARATUS

CROSS-REFERENCE TO RELATED APPLICATIONS

This application claims the benefit of U.S. Provisional Application Serial No. 60/261,663 filed Jan. 16, 2001.

BACKGROUND OF THE INVENTION

The present invention relates to an improved clamping frame for supporting the peripheral edges of a sheet of thermoplastic material in a thermoforming apparatus.

Thermoforming apparatus for forming plastic sheets typically comprise a heating station and a molding station, and several carrier clamping frames are provided for gripping the edges of the plastic sheets so as to support the sheets at the heating station and moving them to the molding station. The clamping frames presently comprise a pair of pivotally connected gripping jaws and a pneumatic cylinder for opening and closing the jaws to grip the sheet. External hoses are provided for actuating each of the cylinders.

Thermoforming apparatus of the described type usually include a large number of such clamping frames, and the presence of the associated large number of hoses can interfere with the operation and movement of the clamping frames, and they are subject to leakage.

It is an object of the present invention to provide a clamping frame of the described type which has a reduced potential for air leaks, and thereby reduces maintenance. It is also an object to provide means for efficiently cooling the frame. Other objects include increasing the capacity and reliability of thermoforming machines of the described type.

SUMMARY OF THE INVENTION

The above and other objects and advantages of the invention are achieved by the provision of a clamping frame which comprises a pair of pivotally interconnected gripping jaws which are pivoted between open and closed positions by at least one actuator. The actuator comprises a fluid operated cylinder, and a fluid delivery system is provided for operating the actuator, which includes first and second fluid passages located within the jaw to which the actuator is attached.

In one preferred embodiment the actuator takes the form of an air cylinder which is mounted to one of the jaws and which includes a slideable piston. Fluid pressure ports are located at the opposite ends of the cylinder so that the piston can be biased and moved in either direction. The jaw to which the cylinder is mounted includes a mounting surface which includes outlets which communicate with respective ones of the fluid passages, and the cylinder is fixedly mounted to the jaw so as to overlie the mounting surface and so that the pressure ports communicate directly with respective ones of the outlets.

Thus with the present invention, leakage prone couplings between air hoses and the air cylinders are eliminated, and the problems of interference caused by the external hoses of the prior art are significantly alleviated. Also, the flow of the fluid (e.g. air) through the internal passages in the jaw tends to cool the jaws.

BRIEF DESCRIPTION OF THE DRAWINGS

Some of the objects and advantages of the present invention having been stated, others will appear as the description proceeds, when considered in association with the accompanying drawings, in which.

DETAILED DESCRIPTION OF THE PREFERRED EMBODIMENTS

Figure 1:
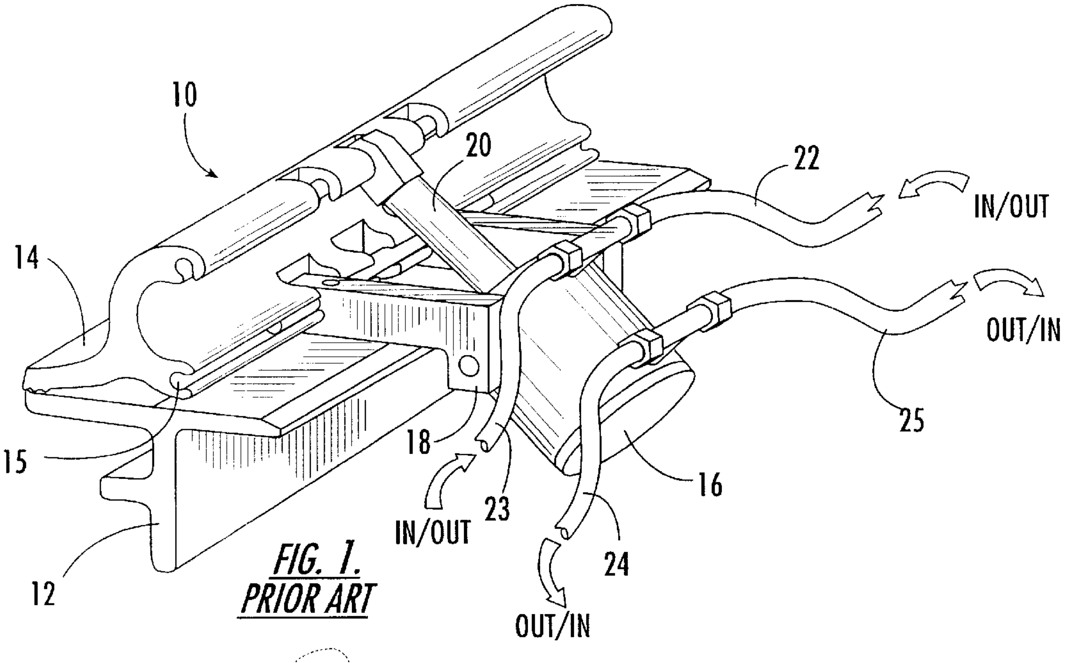
FIG. 1. PRIOR ART
FIG. 1 is a fragmentary perspective view of a clamping frame of the prior art.
Figure 2:
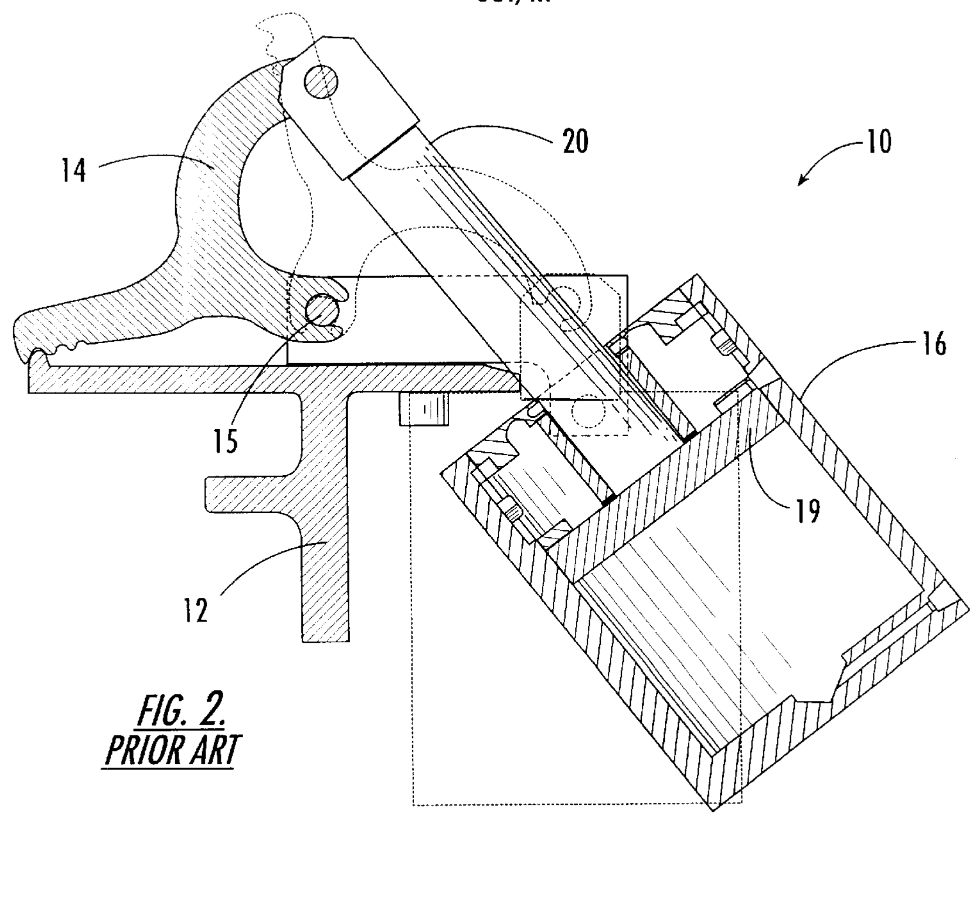
FIG. 2. PRIOR ART
FIG. 2 is a sectional view of the clamping frame shown in FIG. 1.

Referring more particularly to the drawings, FIGS. 1 and 2 show a prior art clamping frame 10 of the described type, and which includes a pair of clamping jaws 12, 14 which are mounted for pivotal movement about the axis of a longitudinal pin 15. Depending upon the length of the clamping frame 10 there may be provided a plurality of air cylinders 16. An air cylinder 16 is pivotally mounted to a bracket 18 which is joined to the lower jaw 12, and the air cylinder has an internal piston 19 which is connected to an output shaft 20. The output shaft 20 is pivotally joined to the upper jaw 14. A pair of flexible hoses 22, 23 are connected via a coupling to one opposite end of the cylinder 16, and a suitable air valve (not shown) is connected to the hoses 22, 23 and leads to a source of pressurized air or to an adjacent air cylinder. A second pair of flexible hoses 24, 25 are connected via a coupling to the other end of the cylinder 16 and serve to function in combination with the first pair of hoses. In operation, the pressurized air enters through one of the hoses into one end of the cylinder and the other hose is vented. Thus the jaws may be pivoted between the open and closed positions as seen in FIG. 2. Also, the cylinder 16 pivots about its mounting axis on the bracket 18 between the solid line and dashed line positions, and the hoses 22, 23 necessarily flex.

Figure 3:
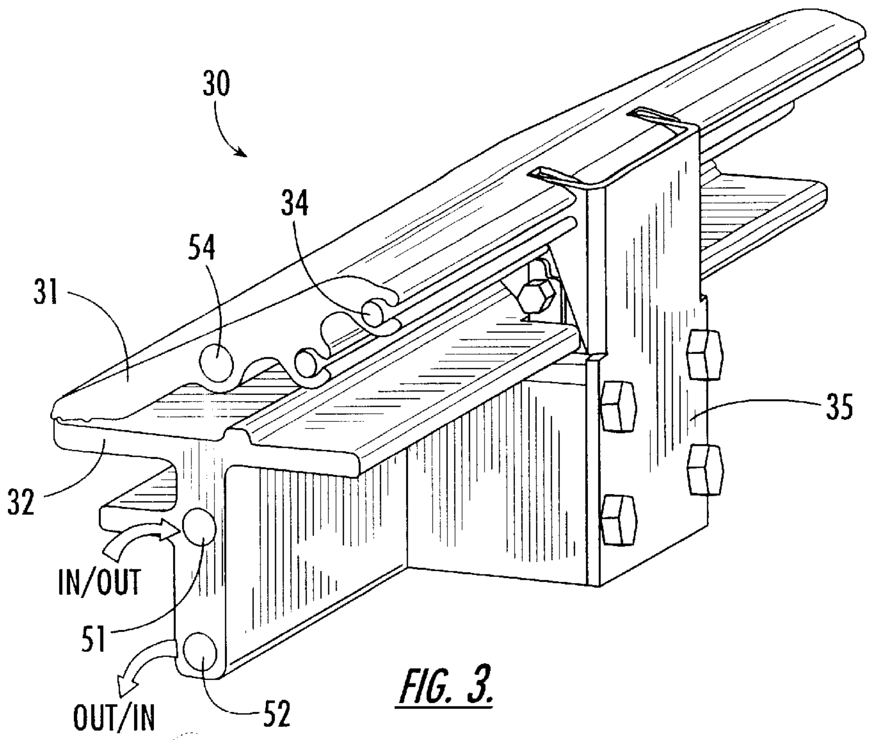
FIG. 3 is a fragmentary perspective view of one embodiment of the clamping frame of the present invention.
Figure 4:
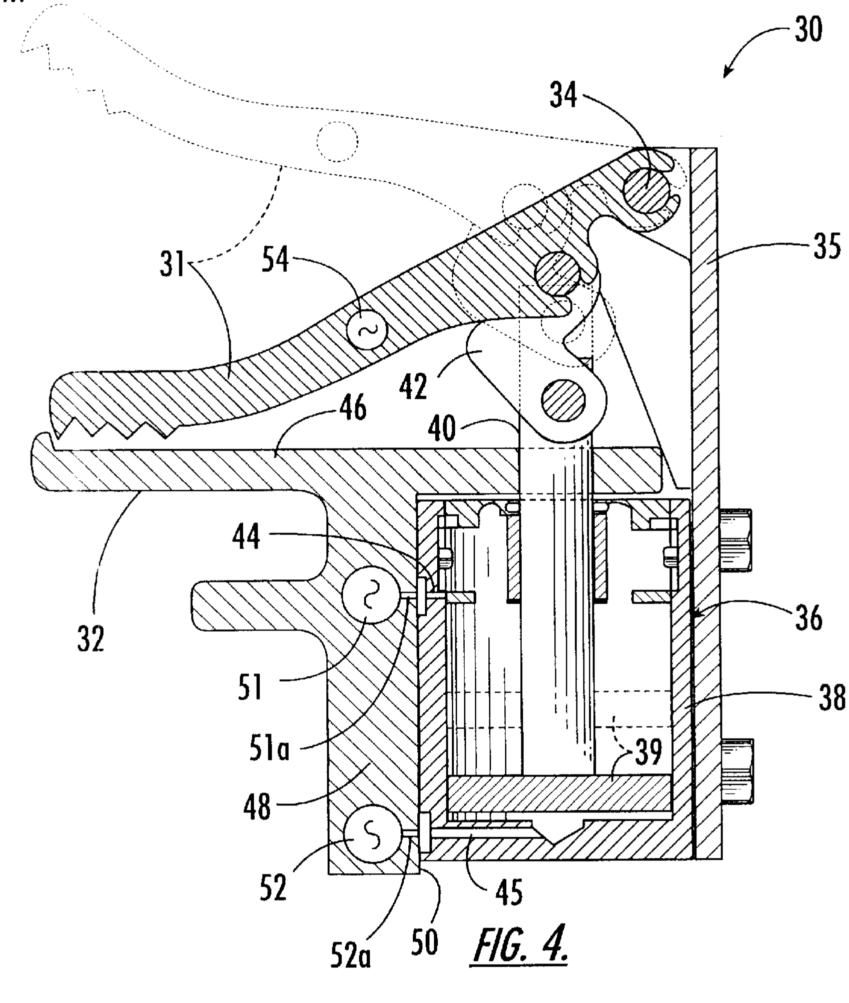
FIG. 4 is a sectional view of the clamping frame shown in FIG. 3.

FIGS. 3 and 4 show one embodiment of the novel clamping frame 30 of the present invention. As illustrated, the clamping frame 30 comprises upper and lower gripping jaws 31, 32 which extend in a longitudinal direction, i.e. perpendicular to the plane of FIG. 4. The jaws 31, 32 are pivotally interconnected by means of a longitudinally extending pivot pin 34 which is secured to a mounting bracket 35 which is in turn bolted to the lower jaw 32. The jaws 31, 32 have opposing clamping faces, and they may be pivoted between a closed position as seen in solid lines in FIG. 4 and wherein the clamping faces directly overlie each other to grip and retain the peripheral edge of the plastic sheet (not shown) therebetween, and an open position as seen in dashed lines in FIG. 4.

At least one actuator 36 is provided for pivoting the jaws between the open and closed positions, it being understood that in the case of clamping frames which have a relatively long longitudinal length, several actuators 36 may be provided which are longitudinally spaced apart. The actuator 36 comprises an air cylinder 38 having a piston 39 slideably mounted therein, and the piston 39 is connected to an output shaft 40. The output shaft 40 is connected via a linkage 42 to the upper jaw 31, and the linkage 42 is pivotally connected to both the output shaft 40 and the upper jaw 31. Thus when the piston 39 is in its lower position, the jaws are closed, and when the piston is raised the jaws are opened.

The air cylinder 38 includes air pressure ports 44, 45 in the respective opposite ends of the cylinder, so that when pressurized air enters the upper port 44 the piston 39 is lowered and when the air enters the lower port 45 the piston 39 is raised.

In the embodiment of FIGS. 3 and 4, the lower jaw 32 has a generally T-shaped cross section and it is composed of a generally horizontal upper leg 46 and a depending leg 48. The upper jaw 31 is generally flat, and the upper jaw and the pivot pin 34 are positioned on the side of the upper leg opposite the depending leg 48. The depending leg 48 includes a mounting surface 50 on the right side thereof as seen in FIG. 4, and the cylinder 38 of the actuator is mounted to the depending leg 48 so as to overlie the mounting surface 50 in a contiguous relationship. Also, the cylinder 38 is oriented such that the output shaft 40 is disposed in a generally vertical orientation.

An air delivery system is provided for selectively delivering pressurized air to the fluid pressure ports 44, 45 to cause the piston 39 to move in either direction within the cylinder 38 and thereby cause the jaws 31, 32 to open and close. The air delivery system includes first and second air delivery lines 51, 52 which extend longitudinally within the depending leg 48 of the lower jaw 32. Also, the mounting surface 50 includes outlets 51*a*, 52*a* which communicate with respective ones of the air delivery lines 51, 52. The outlets 51*a*, 52*a* are positioned so that when the cylinder 38 is assembled to the depending leg as seen in FIG. 4, the pressure ports 44, 45 communicate directly with respective ones of the outlets 51*a*, 52*a*, thereby establishing communication between the ports and air delivery lines. A suitable O-ring seal or the like may be positioned at the interface between the ports and outlets to assure an air tight interconnection.

The air delivery lines 51*a*, 52*a* are connected via conventional valves, to a source of pressurized air (not shown) so as to permit air to flow in either direction through the lines and thereby permit control of the movement of the piston 39 and thus the jaws 31, 32.

As illustrated, the upper jaw 31 includes an internal, longitudinally extending air line 54 which permits a cooling air stream to be passed through the upper jaw.

Figure 5:
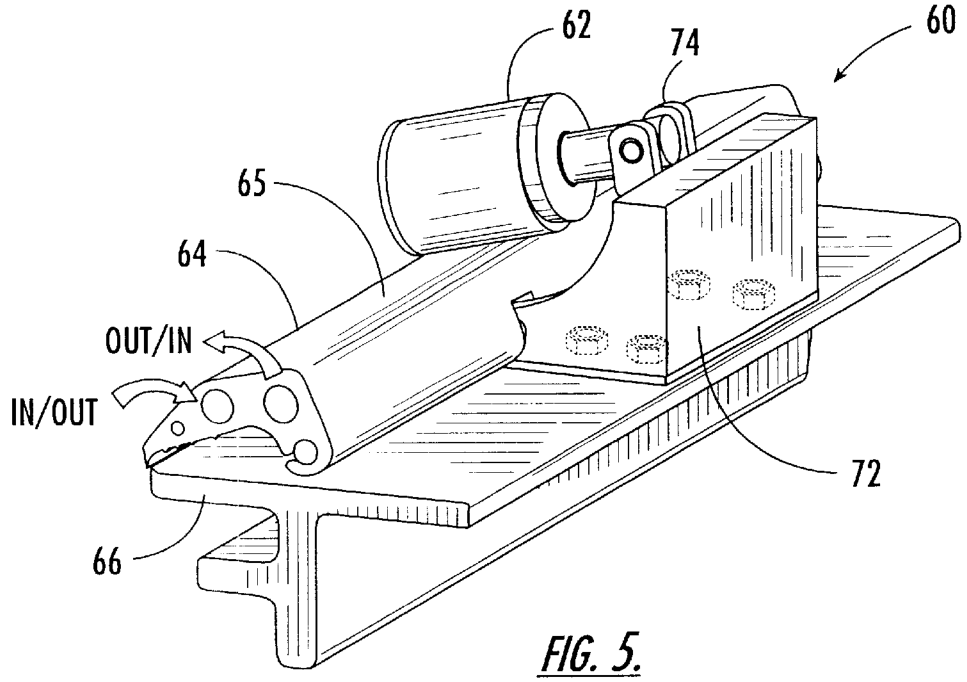
FIGS. 5 and 6 are views corresponding to FIGS. 3 and 4, and showing a further embodiment of the invention.
Figure 6:
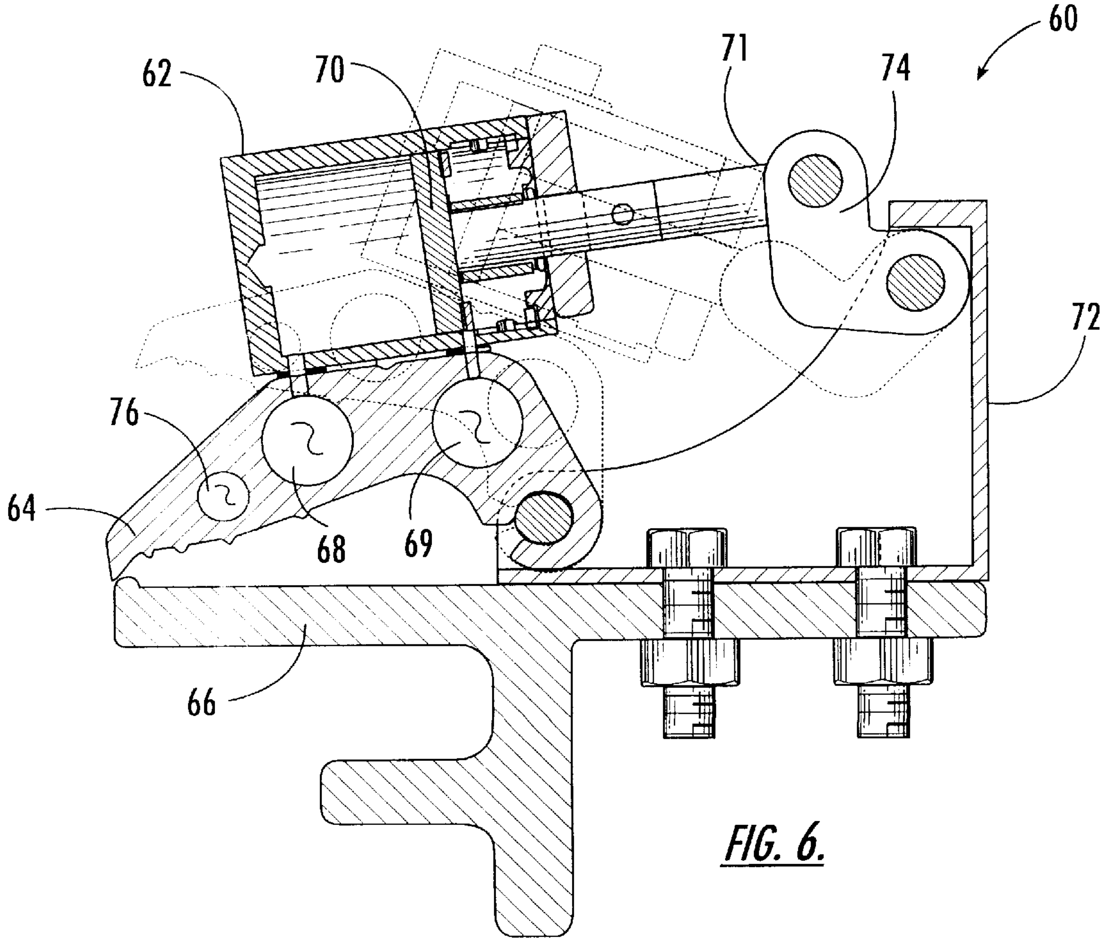

FIGS. 5 and 6 illustrate a second embodiment of a clamping frame 60 which embodies the invention, wherein the actuator 62 is mounted to the upper jaw 64. More particularly, the upper jaw 64 has a mounting surface 65 which is located on the side of the upper jaw opposite the lower jaw 66. The upper jaw 64 includes two air delivery lines 68, 69, which communicate with outlets on the mounting surface 65 and which in turn communicate with the air delivery lines 68, 69.

The actuator 62 is mounted to the mounting surface 65 so as to be oriented so that the piston 70 and output shaft 71 move in a generally horizontal direction, and the output shaft 71 is connected to a mounting bracket 72 via a pivotable linkage 74. The mounting bracket 72 is in turn connected to the lower jaw 66 by bolts.

The air delivery lines 68, 69 are connected to a suitable pressurized air source as described above, so that the movement of the piston causes the upper arm 64 to move between the closed position as seen in solid lines and the open position as seen in dashed lines in FIG. 6.

The upper jaw 64 also includes an internal air line 76 which permits a cooling air flow as described above.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A clamping frame for supporting the peripheral edges of a sheet of thermoplastic material during heating and forming operations and the like, comprising a pair of gripping jaws which extend in a longitudinal direction and which are pivotally connected to each other to permit relative pivotal movement about a longitudinal axis between open and closed positions, with said gripping jaws having opposed longitudinally extending clamping faces which directly overlie each other when the jaws are pivoted to the closed position to grip and retain the peripheral edge of the sheet therebetween, at least one actuator for pivoting the jaws between the open and closed positions, with said one actuator comprising a piston slideably mounted in a cylinder, and fluid pressure ports at the respective opposite ends of the cylinder, with the cylinder being connected to one of the jaws and the piston being connected to the other of the jaws so that movement of the piston in the cylinder causes the jaws to pivot about the pivotal axis between the open and closed positions, and a fluid delivery system for selectively delivering a pressurized fluid to the fluid pressure ports to cause the piston to move in either direction within the cylinder and thereby cause the jaws to move between the open and closed positions, said fluid delivery system including first and second fluid delivery lines extending longitudinally within said one jaw, with the first and second fluid delivery lines being connected to respective ones of the fluid pressure ports of the cylinder.

2. The clamping frame as defined in claim 1 wherein the one jaw includes a mounting surface which includes outlets which communicate with respective ones of the fluid delivery lines, and wherein the cylinder is fixedly mounted to the one jaw so as to overlie the mounting surface and so that the pressure ports communicate directly with respective ones of the outlets.

3. The clamping frame as defined in claim 2 wherein at least one of the jaws includes an internal, longitudinally extending passageway for the passage of a cooling air stream therethrough.

4. The clamping frame as defined in claim 2 wherein said one jaw has a generally T-shaped cross section and includes a generally horizontal upper leg and a depending leg, and wherein the other jaw and the pivotal axis are positioned on the side of the upper leg opposite the depending leg.

5. The clamping frame as defined in claim 4 wherein said mounting surface is located on one side of the depending leg of said one jaw, and wherein the fluid delivery lines extend longitudinally within said depending leg.

6. The clamping frame as defined in claim 5 wherein the cylinder is mounted to said one jaw so that the piston moves in a generally vertical direction, and wherein a piston shaft and linkage interconnect the piston to the other jaw.

7. The clamping frame as defined in claim 6 wherein at least one of the jaws further includes an internal longitudinally extending passageway for the passage of a cooling air stream therethrough.

8. The clamping frame as defined in claim 2 wherein said other jaw includes a generally horizontal upper leg, wherein the one jaw and pivotal axis are positioned above the upper leg of the other jaw, and wherein said mounting surface is located on the side of said one jaw opposite the upper leg of the other jaw.

9. The clamping frame as defined in claim 8 wherein the cylinder is mounted to the one jaw so that the piston moves in a generally horizontal direction, and wherein a piston shaft and linkage interconnect the piston to the other jaw.

10. The clamping frame as defined in claim 9 wherein the fluid delivery lines extend longitudinally within the one jaw.

11. The clamping frame as defined in claim 10 wherein at least one of the jaws further includes an internal longitudinally extending passageway for the passage of a cooling air stream therethrough.

12. The clamping frame as defined in claim 1 wherein said one actuator is located at an intermediate location along the longitudinal length of said one jaw.

13. The clamping frame as defined in claim 1 wherein said first and second fluid delivery lines communicate with a longitudinal end of said one jaw.

14. A clamping frame for supporting the peripheral edges of a sheet of thermoplastic material during heating and forming operations and the like, comprising a pair of gripping jaws which extend in a longitudinal direction and which are pivotally connected to each other to permit relative pivotal movement about a longitudinal axis between open and closed positions, with said gripping jaws having opposed longitudinally extending clamping faces which directly overlie each other when the jaws are pivoted to the closed position to grip and retain the peripheral edge of the sheet therebetween, at least one actuator for pivoting the jaws between the open and closed positions, with said one actuator comprising a piston slideably mounted in a cylinder, with the cylinder being connected to one of the jaws and the piston being connected to the other of the jaws so that movement of the piston in the cylinder causes the jaws to pivot about the pivotal axis between the open and closed positions, and means for moving the piston in opposite directions and including a fluid pressure port adjacent at least one of the opposite ends of the cylinder, a fluid delivery system for selectively delivering a pressurized fluid to the at least one fluid pressure port to cause the piston to move within the cylinder and thereby cause the jaws to move, said fluid delivery system including a fluid delivery line extending longitudinally within said one jaw and being connected to the at least one fluid pressure port.

15. The clamping frame as defined in claim 14 wherein said one actuator is located at an intermediate location along the longitudinal length of said one jaw, and wherein the fluid delivery line communicates with a longitudinal end of said one jaw.

* * * * *